Patented July 14, 1942

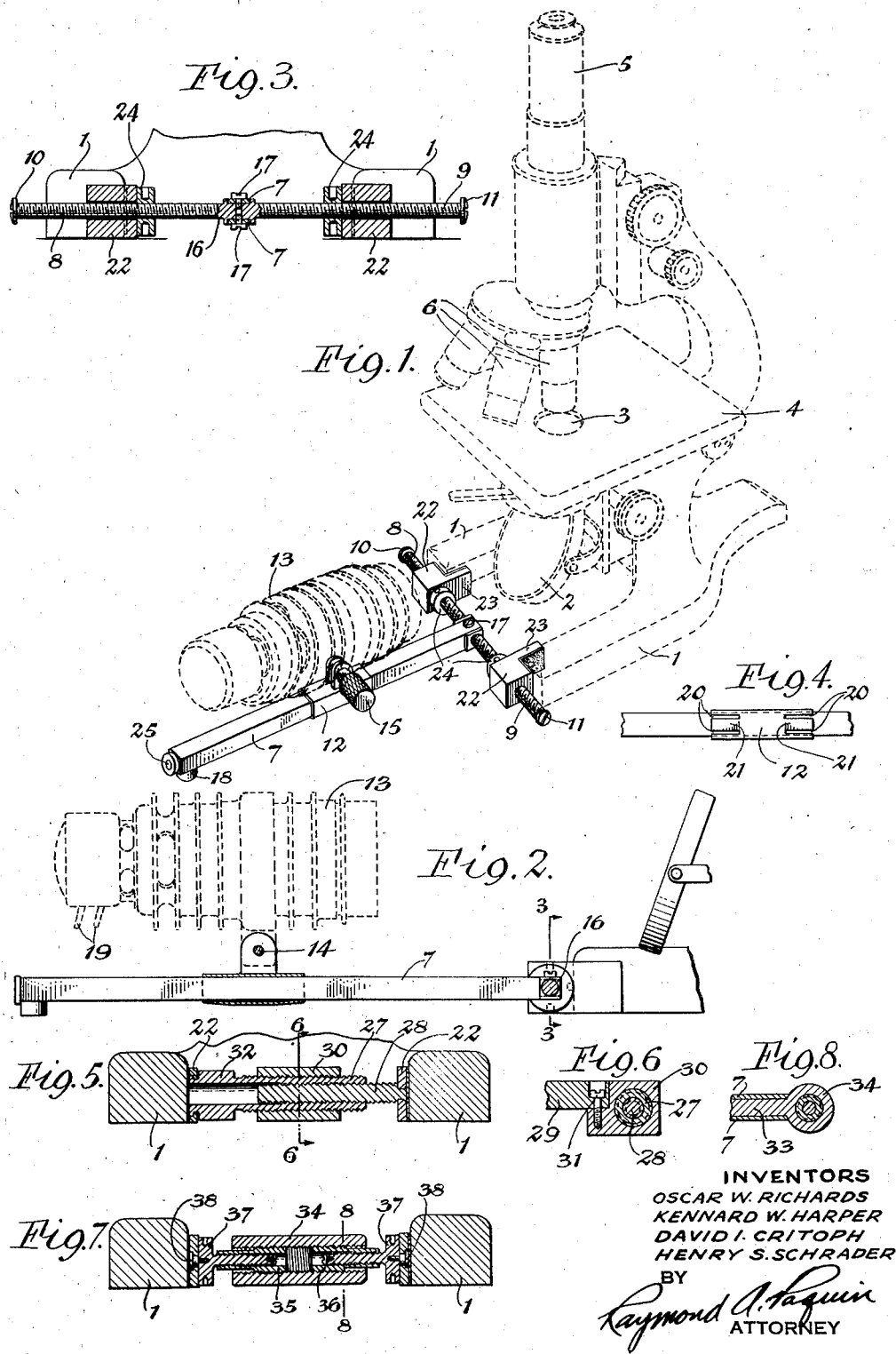

2,289,575

UNITED STATES PATENT OFFICE 2,289,575

ILLUMINATING DEVICE FOR INSTRUMENTS

David I. Critoph, Henry S. Schrader, and Kennard W. Harper, Buffalo, and Oscar W. Richards, Snyder, N. Y., assignors to Spencer Lens Company, Buffalo, N. Y., a corporation of New York Application May 1, 1940, Serial No. 332,794

6 Claims. (Cl. 240—2)

This invention relates to illuminating devices for microscopes and the like and has particular reference to new and improved means for adjustably positioning illuminating means in desired relation with an instrument of the type set forth.

One of the objects of the invention is to provide new and improved means for adjustably supporting illuminating means in desired relation with an instrument.

Another object of the invention is to provide a new and improved illuminating attachment for microscopes or the like which may be easily and quickly attached to or detached from the instrument.

Another object of the invention is to provide a new and improved attachment for supplying illumination for a microscope or similar type of instrument having the base formed with separate brackets or legs, which attachment has means whereby it may be quickly and easily attached to or detached from said separate brackets or legs.

Referring to the drawing:

Fig. 1 is a perspective view showing the device embodying the invention attached to a microscope;

Fig. 2 is a fragmentary side view, partially in section, of the arrangement shown in Fig. 1;

Fig. 3 is a sectional view taken on line 3—3 of Fig. 2, looking in the direction of the arrows;

Fig. 4 is a bottom view of the lamp supporting clamp;

Fig. 5 is a view similar to Fig. 3, but showing a modified form of the invention;

Fig. 6 is a sectional view taken on line 6—6 of Fig. 5;

Fig. 7 is a view similar to Figs. 3 and 5 but showing a further modified form of the invention; and Fig. 8 is a sectional view taken on line 8—8 of Fig. 7.

In the use of microscopes it is important that an adjustable source of illumination be provided to allow adjustment of the illumination according to the particular object under inspection. It is also preferable that such source of illumination when in adjusted position be so fixed with respect to the microscope that it will remain in desired adjusted relation therewith and that any movement of the microscope or illumination means will not interfere with said adjusted relation between the members.

Some of the more popular types of microscopes are formed with bases or supports having separate members or legs. One of the principal objects of the present invention is to provide a new and improved illumination attachment for microscopes of the separate leg type, which attachment may be quickly and easily attached to or detached from a microscope and wherein the adjusted relation between the microscope and the illuminating means will not be disturbed because of any movement of one of said members.

Referring more particularly to the drawing wherein similar reference characters designate corresponding parts throughout the several views, the illuminating attachment is shown, for the purpose of illustration, attached to a microscope of the separate leg type having the legs 1, the mirror 2 for directing light through the opening 3 in the stage 4, and having the eyepiece 5 and objectives 6.

The illuminating attachment comprises the slide bar 7 and a cross member having the threaded portions 8 and 9 and enlarged end portions 10 and 11.

The slide bar 7 has slidably mounted thereon the lamp carrier 12 adapted to support the lamp 13 which is secured thereto through the pivotal connection 14 whereby the lamp may be adjusted to any desired angular relation with said mirror or reflector 2 and locked in said position by means of the set screw 15.

The forward end of the slide bar 7 is formed with a rectangular slot adapted to receive the similar shaped member 16 to which the threaded members 8 and 9 are joined. The members 8, 9 and 16 may be formed integral or the members may be formed separately and secured together by soldering, welding or any other suitable method. The screws or the like 17 lock the said member 16 in the said slot in the forward end of the member 7.

Adjacent the outer extremity of the member 7 is provided the foot or rest 18 which supports the bar 7 at its outer end while its forward end is supported by the connection with the member 16 as previously described.

The lamp or illuminating device 13 is provided with a socket connection 19 adapted to be connected to the usual current supply.

As shown in detail in Fig. 4, the lamp carrier 12 which is preferably formed of resilient material, is provided on its bottom, adjacent its outer edges, with the slots 20. Then by bending the portions 21, these portions 21 act as spring clips to retain the member 12 in adjusted position on the slide bar 7.

On the threaded members 8 and 9 are slidingly mounted the L shaped supporting members 22 leaving the offset projecting portions 23. These supporting members 22 are adapted to engage the corners of the separate legs 1 of the instrument and then by tightening the nuts 24 the said supports are caused to firmly contact the said legs 1 to retain the lamp holder in related position with the instrument. It will be noted that we have provided a pin member 25, which is usually placed in the hollow outer end of the slide bar 7 for convenience, which pin member 25 is adapted to fit the openings in the nuts 24 to tighten them further than would be possible by the use of the hand only.

Also, it will be noted that we have provided a lining member 26 of cloth, felt, or the like which is adapted to be secured to the face of the L shaped members 22 and therefore will lie between said members 22 and the contacting portions of the legs 1 of the instrument. This lining member 26 provides additional friction in the contact between the parts and provides a tighter and more secure junction between the members 22 and legs 1.

In the modified form of the invention shown in Figs. 5 and 6, the contacting members 22 are mounted on the outer extremities of the threaded telescoping members 27 and 28. The forward end 29 of the slide bar 7 is secured to the supporting block 30 by means of the screw 31.

In this construction, shouldered portion 32 of the member 27 is preferably knurled so that by turning this knurled portion 32 the members 22 may be forced into engagement with the legs 1 or loosened therefrom as desired. It will be noted that in this construction it is only necessary to turn or tighten the single member 32 to attach or detach the illuminating attachment.

In the further modified form of the invention shown in Figs. 7 and 8, the forward end of the slide bar 7 is hollowed out so as to fit over the end 33 of the threaded member 34. In this form there is provided the two threaded members 35 and 36 adapted to engage the threaded bore of the member 34 and carrying on their outer ends the nuts 37 to which are secured the L shaped contacts 22 which are held thereon by the screws 38.

In this form the contacts 22 are tightened or loosened by turning said nuts 37 and if desired there may also be provided the socket pin 25 as previously described for tightening the nuts 37 tighter than is possible by the hand alone.

It will be seen that when the illuminating attachment has been secured to the microscope or the like, the lamp 13 may be moved forward or back to desired relation with the reflector 2 to provide desired illumination for the instrument. Also the lamp may be pivoted to a desired angle and locked in said angular position by the set screw 15.

It will be apparent that while the L shaped members have been shown as engaging the inner corners of the legs 1, it is a simple matter to reverse their action so that they would clamp the outer edges of said legs 1, and then instead of being forced outwardly, would be pulling towards each other so as to clamp the legs from the outer rather than the inner sides.

It will be apparent that the device as shown may be used with instruments having bases of different sizes and shapes, etc., as the device may be readily adjusted as necessary.

From the foregoing it will be seen that we have provided simple, efficient and economical means for obtaining all of the objects of the invention, and particularly the provision of an illuminating attachment for microscopes or the like which may be easily and quickly attached to or detached from the instrument as desired.

Having described our invention, we claim:

1. In a device of the character described, a bar, a lamp support slidably mounted on said bar, a cross member having threaded portions, said cross member being secured adjacent its center to said bar adjacent one end thereof, clamp members on said cross member on each side of said bar, and threaded members engaging the threaded portions of said cross member to cause said clamp members to engage a microscope base to retain the bar in fixed relation therewith.

2. In a device of the character described, a bar, a lamp support slidably mounted on said bar, means for locking said lamp support in adjusted position on said bar, a cross member having threaded portions, said cross member being secured adjacent its center to said bar adjacent one end thereof, L shaped clamp members on said cross member on each side of said bar and threaded members engaging the threaded portions of said cross member to cause said clamp members to engage a microscope base to retain the bar in fixed relation therewith.

3. In a device of the character described, a bar, a lamp support slidably mounted on said bar, a threaded cross member secured adjacent its center to said bar adjacent one end thereof, clamp members adjacent the ends of said cross member and threaded members threadedly engaging the cross member adjacent each of said clamp members to cause said clamp members to engage a microscope base to retain the bar in fixed relation therewith.

4. In a device of the character described, a bar, a lamp support slidably mounted on said bar, a cross member adjacent one end of said bar and secured adjacent its center to said bar, said cross member having a threaded portion on each side of said bar, clamp members slidably mounted on said cross member and adapted to engage the base of a microscope and threaded members in threaded engagement with the threaded portions on said cross member and adapted when tightened to cause said clamp members to engage a microscope base to retain the bar in fixed relation with the microscope.

5. In a device of the character described, a bar, a lamp support slidably mounted on said bar, means for locking said lamp support in adjusted position on said bar, a cross member secured adjacent its center to said bar adjacent one end theref, said cross member having threaded portions, clamp members slidably mounted on said cross member, one of said clamp members being on each side of the connection between said bar and said cross member, a lock member for each of said clamp members, each of said lock members having a threaded portion adapted to engage one of the threaded portions on said cross member to cause said clamp members to engage the base of a microscope to retain the bar in fixed relation with the microscope.

6. In a device of the character described, a bar, a lamp support slidably mounted on said bar, a cross member secured to said bar adjacent one end thereof, said cross member comprising a tubular member having a threaded bore and a threaded outer surface, and a member having a threaded surface adapted to threadedly engage said threaded bore, each of said members having clamp members adjacent an end thereof and a member having a threaded bore adapted to threadedly engage the threaded outer surface of said tubular member to cause said clamp members to engage the separated legs of a microscope base to retain said bar in fixed relation with said microscope.

OSCAR W. RICHARDS.
KENNARD W. HARPER.
DAVID I. CRITOPH.
HENRY S. SCHRADER.